(12) United States Patent
Owoc et al.

(10) Patent No.: US 6,332,277 B1
(45) Date of Patent: Dec. 25, 2001

(54) LEVEL WITH SECURING APPARATUS

(76) Inventors: Greg J. Owoc, 106 Galphin Dr., Greenville, SC (US) 29609; Timothy D. Mika, 919 S. 14$^{th}$ Pl., Rogers, AK (US) 72758

( * ) Notice: Subject to any disclaimer, the term of this patent is extended or adjusted under 35 U.S.C. 154(b) by 0 days.

(21) Appl. No.: 09/347,450

(22) Filed: Jul. 6, 1999

(51) Int. Cl.$^7$ .................................................. G01C 9/28
(52) U.S. Cl. .............................. 33/373; 33/374; 33/382
(58) Field of Search ............................ 33/370, 371, 372, 33/373, 374, 375, 347, 381, 382, DIG. 1, 412, 529

(56) References Cited

U.S. PATENT DOCUMENTS

| | | |
|---|---|---|
| 961,599 | 6/1910 | Franchini . |
| 1,041,622 | 10/1912 | Guilfoyle . |
| 2,677,192 * | 5/1954 | Anderson ................................ 33/372 |
| 2,752,692 * | 7/1956 | Smith ..................................... 33/374 |
| 2,785,477 | 3/1957 | Gregory . |
| 2,932,303 * | 4/1960 | Smith ..................................... 33/371 |
| 3,707,772 | 1/1973 | Cotter . |
| 3,820,249 * | 6/1974 | Stone ..................................... 33/347 |
| 4,066,232 * | 1/1978 | Hermeyer ................................ 33/372 |
| 4,343,093 | 8/1982 | Eadens . |
| 4,593,475 * | 6/1986 | Mayes .................................... 33/347 |
| 4,829,676 * | 5/1989 | Waldron .................................. 33/372 |
| 4,970,796 | 11/1990 | Masters et al. . |
| 4,976,040 * | 12/1990 | Mish et al. ............................... 33/372 |
| 5,044,087 | 9/1991 | McAuslin . |
| 5,148,605 * | 9/1992 | Julia ....................................... 33/370 |
| 5,174,034 * | 12/1992 | Swanda .................................. 33/365 |
| 5,207,004 | 5/1993 | Gruetzmacher . |
| 5,408,752 * | 4/1995 | Eadens ................................... 33/376 |
| 5,421,094 | 6/1995 | McCord et al. . |
| 5,581,900 | 12/1996 | Payne . |
| 5,749,151 * | 5/1998 | Scott et al. .............................. 33/370 |
| 5,799,404 | 9/1998 | Payne . |
| 5,815,937 * | 10/1998 | Glorioso, Jr. ............................ 33/370 |
| 5,819,425 | 10/1998 | Payne . |
| 6,029,359 * | 2/2000 | Szumer .................................. 33/373 |

* cited by examiner

*Primary Examiner*—Jacob K. Ackun, Jr.
*Assistant Examiner*—Faye Francis
(74) *Attorney, Agent, or Firm*—Bacon & Thomas, PLLC

(57) ABSTRACT

A level including a frame having a reference surface, a level sensor secured to the frame, and an articulated arm pivotally connected at one end to the frame for securing the reference surface to a test surface. The articulated arm includes an inner member pivotally connected to the frame at one end and an outer member extending from a free end of the inner member. The inner member is rotationally biased against the frame while the outer member is pivotally connected to the inner member and rotationally biased against the inner member. The inner and outer members are rotationally biased in opposite directions for folding against the frame. The level may also include spools, idler wheels, take-up fingers, and swivels for supporting the band.

9 Claims, 5 Drawing Sheets

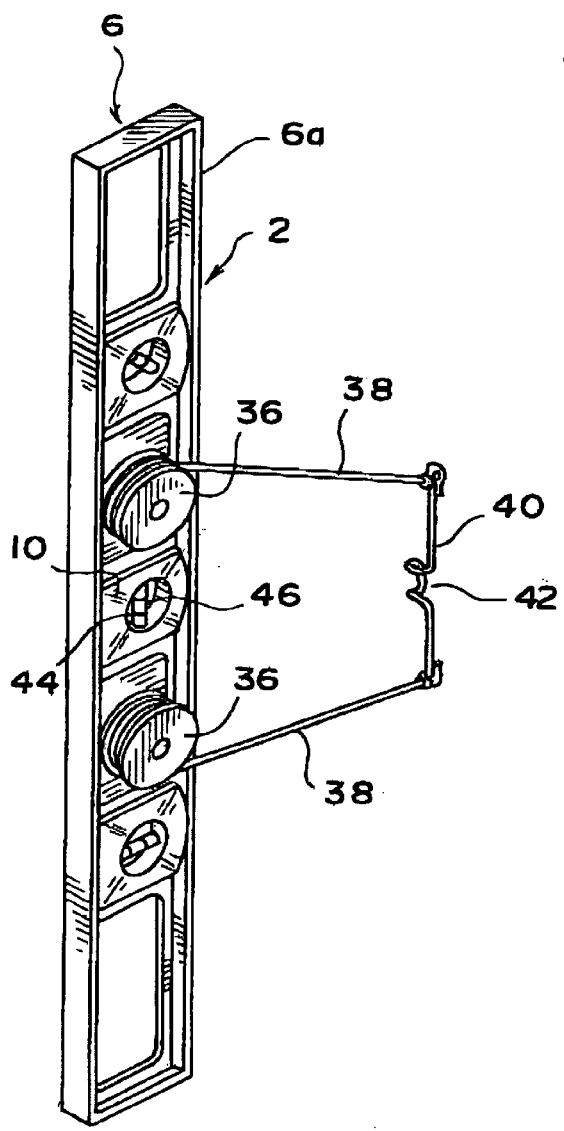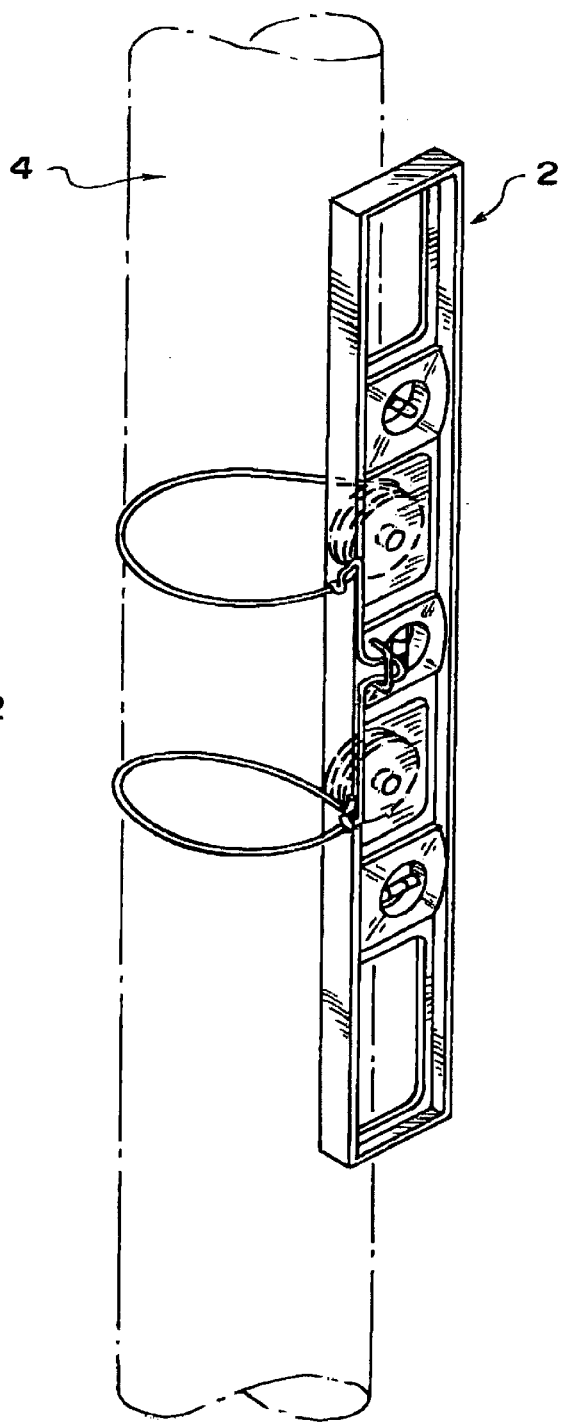
FIG. 5
FIG. 6

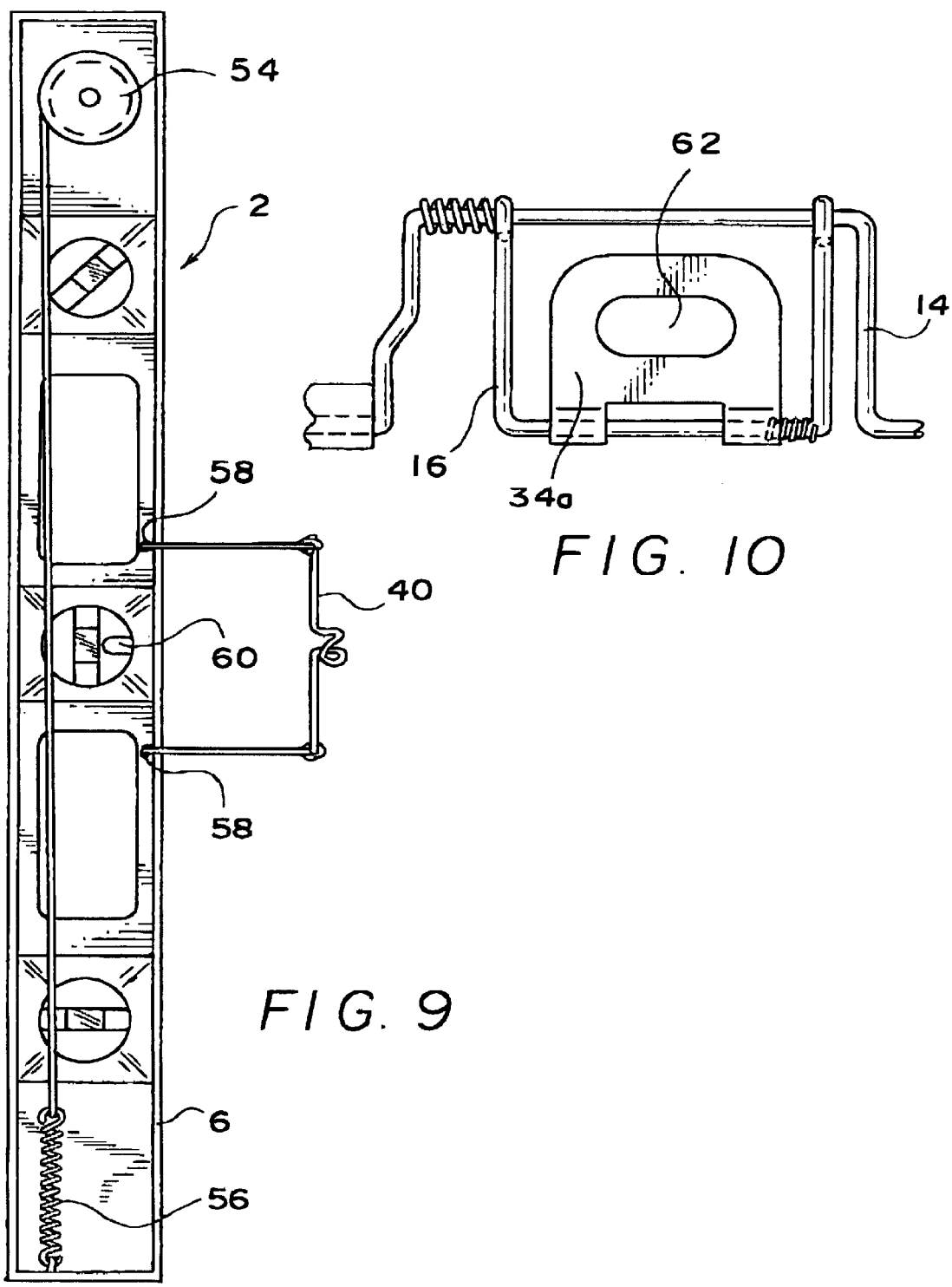

LEVEL WITH SECURING APPARATUS

BACKGROUND OF THE INVENTION

1. Field of the Invention

This disclosure generally relates to geometrical instruments, and, more particularly, to terrestrial gravitation responsive levels and plumbs with work attaching means having elastic bias type clamping, or an encircling loop or strap.

2. Description of Related Art

In any type of construction, there are numerous components that must be precisely oriented. For example, wall studs must be vertical, floor joists must be horizontal, window frames must be square, and gravity drainage systems must be adequately graded. The basic tools for ensuring that such components are properly oriented are the level and the plumb.

The most common types of levels and plumbs are the bubble-type which use a sealed vial that is partially filled with a liquid. The resulting air bubble senses and indicates the orientation of the instrument based upon its position in the vial. When the vial is horizontal, the bubble will move to the center. When the vial is rotated, the bubble will move toward the higher end of the vial. Of course, levels and plumbs may also use a variety of other technologies, besides bubble vials, for sensing and indicating horizontal and/or vertical grades.

In practice, the bubble vial, or other level sensor, is mounted in a frame in order to facilitate its positioning on a test surface. The two most common types of frames are the box frame and the I-beam frame which are named after the appearance of their transverse cross-sections. The orientation of the vial in the frame depends on the intended use for the instrument. If the device is intended for use in measuring the horizontal orientation of a surface, then the vial is mounted parallel to the reference side of the frame and the tool is called a "level." On the other hand, when the vial is mounted perpendicular to the reference side of the frame, it can be used to measure the vertical orientation of a surface and is called a "plumb." In fact, most such instruments are provided with both horizontal and vertical bubble vials so that they can be used as both levels and plumbs. In some cases, the vial may even be mounted at an angle other than horizontal or vertical with respect to the reference side of the frame in order to check a particular grade or slope. Consequently, the term "level" is now used to broadly encompass geometrical instruments for sensing horizontal, vertical, and other angular orientations.

When "shooting a level" with a bubble-type level, the reference side or surface of the frame is placed flush against the surface of a test member to be measured. If the bubble is centered in the appropriate vial, then the surface is properly oriented and the member can be permanently secured. If the bubble is not centered in the vial, then the member must be rotated until the bubble moves to the appropriate position.

One drawback associated with such levels is that they usually require at least one hand for holding the level flush against the test member while it is being measured and/or positioned. Since it generally requires two hands to position and secure a large test member, a minimum of two people are needed in order to allow one person to hold the level while the other person holds the structural member. If the person holding the level is not diligent, then one end of the level may move away from the test surface so that the level produces a false reading. Similarly, if the other person cannot keep the test member sufficiently still, then an inaccurate reading will also be produced. Even with less unwieldy test members, it is generally not safe for a single person to hold the level in one hand and the structural member in the other since the slippage of either could result in damage to the instrument and/or injury to the user.

These issues have been addressed with conventional "prior art" technology by providing levels which can be independently secured to a test surface or member. For example, U.S. Pat. No. 4,970,796 discloses a self supporting spirit level tool with three types of fasteners—retractable nail-like pins for penetrating into the test surface, elastic cords for clasping the test member, and magnets for clinging to steel posts and pipes. Obviously, the pins will damage any surface into which they penetrate and the magnets will not cling to non-magnetic surfaces. Furthermore, the elastic cords are merely strung through holes in the body of the tool which can cause them to easily fray and/or slip out of position. Moreover, the cords are held on the tool in a position that can cause them to interfere with measurements being made while using the other fasteners.

U.S. Pat. No. 5,207,004 discloses a post level in which one end of a rubber band is knotted about an anchor and then wrapped around a post before the other end is hooked onto a peg extending from the level. Although this arrangement allows the rubber band to be easily replaced when broken or lost, frequent replacement of the rubber band can be necessary.

U.S. Pat. No. 5,421,094 discloses an adjustable level including a flexible cord connected to a return spring including a loop on the end of the cord for securing to a hook when the cord is wrapped around an object. Although this configuration provides an apparatus for storing the flexible cord when it is not being used, the cord cannot be wound manually and it can be difficult to slip the loop over the end of the hook. Furthermore, since the level uses only a single cord for support, it must be provided with an angled base in order to have adequate stability on curved surfaces.

U.S. Pat. No. 5,581,900 discloses a level clamp for temporarily attaching a level to a construction component. The clamp includes a pair of pivotally-mounted, spring-loaded opposed jaws for temporarily gripping the component. FIGS. 9–15 of that patent illustrate an embodiment in which the jaws are formed from a pair of bent-wire clips, each having a downwardly extending pair of legs with curved side segments and flattened bottom segments. However, as illustrated in FIG. 15 of this patent, the jaws merely pivot around a shaft and do not articulate or wrap around the component being measured. Consequently, the bottom segments of the jaws will be positioned flatly and securely against the side surfaces of a construction component only when the component has the general size and shape shown in FIG. 15.

BRIEF SUMMARY OF THE INVENTION

The present inventions address these and other drawbacks of conventional technology by providing a level including a frame having a reference surface, a level sensor secured to the frame, and an articulated arm, pivotally connected to the frame at one end, for securing the reference surface to a test surface. The articulated arm may include an inner member pivotally connected to the frame at one end and an outer member extending from a free end of the inner member. The inner member is rotationally biased against the frame, and the outer member is pivotally connected to the inner member and rotationally biased against the inner member. Furthermore, the inner and outer members are preferably rotationally biased in opposite directions. The level may also include a tab and/or a gripping tube on the free end of the outer member.

In another embodiment, the level includes a frame having a reference surface, a level sensor secured to the frame, and at least one articulated arm extendable from the frame for clamping the reference surface to a test surface wherein the articulated arm includes an inner member pivotally connected to the frame at one end and a U-shaped outer member pivotally connected at its top end to a free end of the inner member. Once again the inner member is rotationally biased against the frame and the outer member is rotationally biased against the inner member such that the inner and outer members are rotationally biased in opposite directions. At least one of the inner and outer members may be biased by a torsional spring. Furthermore, the level may also include means for locking the inner and/or outer members in a certain angular position.

In yet another embodiment, the level includes a frame having a reference surface, a level sensor secured to the frame, a swivel also secured to the frame, a band having one end fixed to the swivel and a free end with a hook for hooking to the frame when the band is wrapped around a test member. A spool or plurality of fingers extending from the frame may be used for taking-up slack in the band.

In yet another embodiment, the level includes a frame having a reference surface, a level sensor secured to the frame, a band having one end fixed to the frame and a free end, an idler wheel secured to the frame for supporting the band partially wrapped around the idler wheel, and a hook arranged on the free end of the band for hooking to the frame when the band is wrapped around a test member. The band may be double-stranded with the hook secured between the free ends of each strand. The band may also include a resilient member, such as a spring, arranged on its fixed end for securing the bands to the frame.

In still yet another embodiment, the level includes a frame having a reference surface, a level sensor secured to the frame, two take-up wheels secured to one side of the frame, a band extending from each of the take-up wheels, and a hook extending between the free ends of each band for hooking to the frame when the bands are wrapped around a test member. The level sensor may include a vial arranged across a hole in a sight structure supporting the vial where the tip portion of the hook has a shape corresponding to a surface of the sight structure inside the hole. Furthermore, a hook rod may also extend across the hole in the sight structure substantially parallel to the vial for receiving the hook.

BRIEF DESCRIPTION OF THE SEVERAL VIEWS OF THE DRAWINGS

The invention will now be described with respect to the drawings wherein the figures have been labeled with numerals used to identify similar features throughout each of the figures, and wherein

FIG. 5 is a perspective view of another embodiment of a level;

FIG. 6 is a perspective view of the level shown in FIG. 5 arranged on a vertical test member;

FIG. 9 is a side view of an embodiment wherein the hook is centrally located.

FIG. 10 is a side view of a modification including a enlarged tab.

DETAILED DESCRIPTION OF THE PREFERRED EMBODIMENTS

Figure 1:
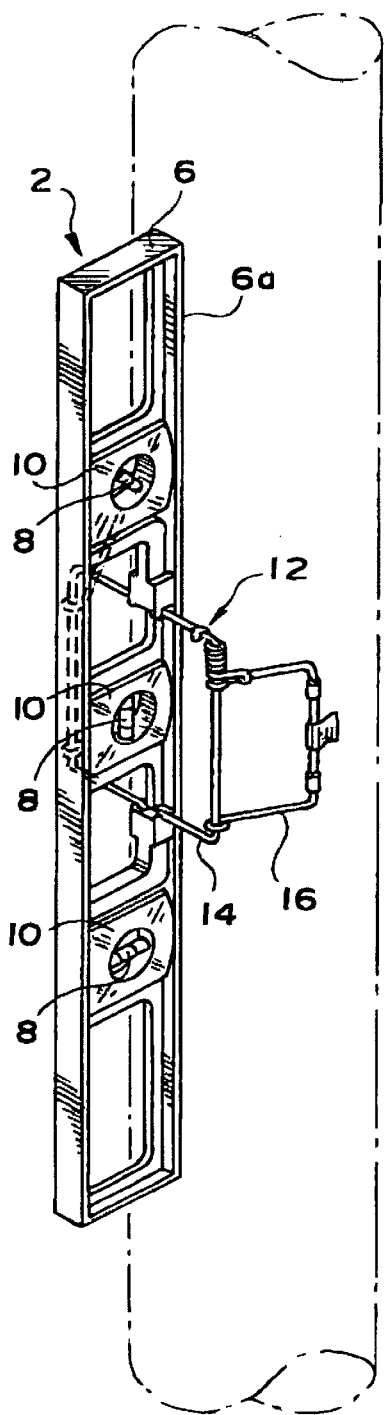
FIG. 1 is a perspective view of a level arranged on a vertical test member.

FIGS. 1–4 illustrate one embodiment of a level 2 including an apparatus for securing the level to a test member 4. Although FIG. 1 shows the level 2 secured in a vertical position on a cylindrical test member, the level to may also be secured in a horizontal position, or at other grades, and on test members having other shapes.

The level 2 includes an I-beam frame 6 having a reference side or surface 6a abutting the surface of the test member 4. The other sides, surfaces, and edges of the frame 6 may also be used as reference surfaces. Other types of frames, including box frames, may also be used.

The frame 6 supports three bubble vials 8 arranged in various orientations along the length of the frame in sight structures 10; however, any other number and arrangement of vials 8 may also be used. The sight structure 10 may be, for example, in the form of a plastic molding to which the vial 8 is permanently secured for accurate positioning and easy mounting in the frame 6. In the arrangement illustrated in FIG. 1, the lower bubble vial 8 senses and indicates the vertical orientation of the test member 4. A variety of other level sensing and\or indicating devices may also be used with the frame 6 instead of, or in addition to, the bubble vials 8 and sight structures 10.

Figure 4:
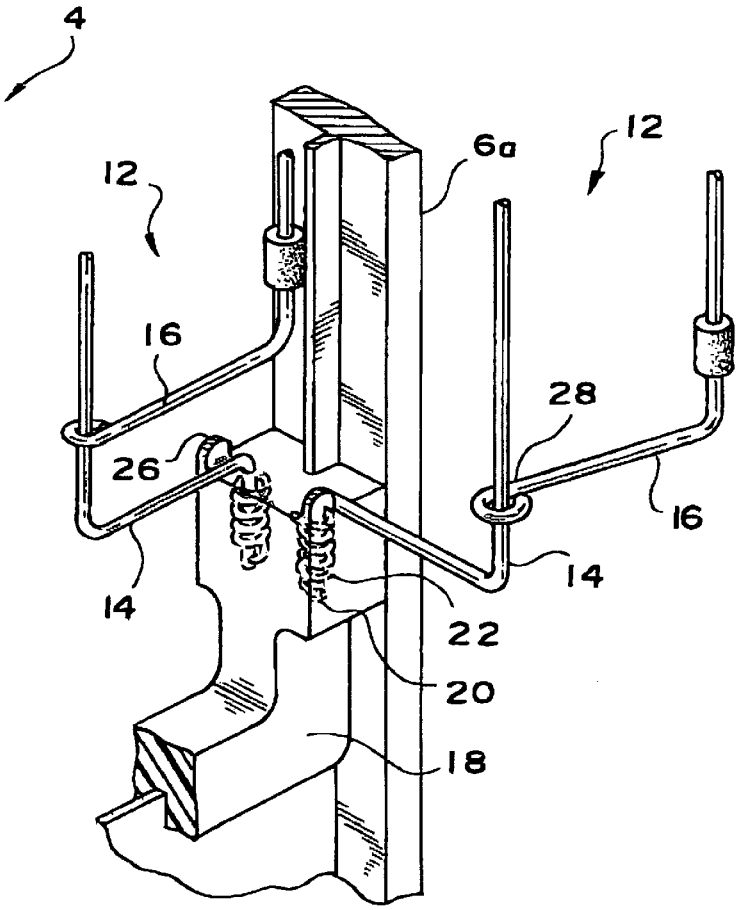
FIG. 4 is an enlarged perspective view of a portion of the level shown in FIGS. 1–3.
Figures 2, 3:
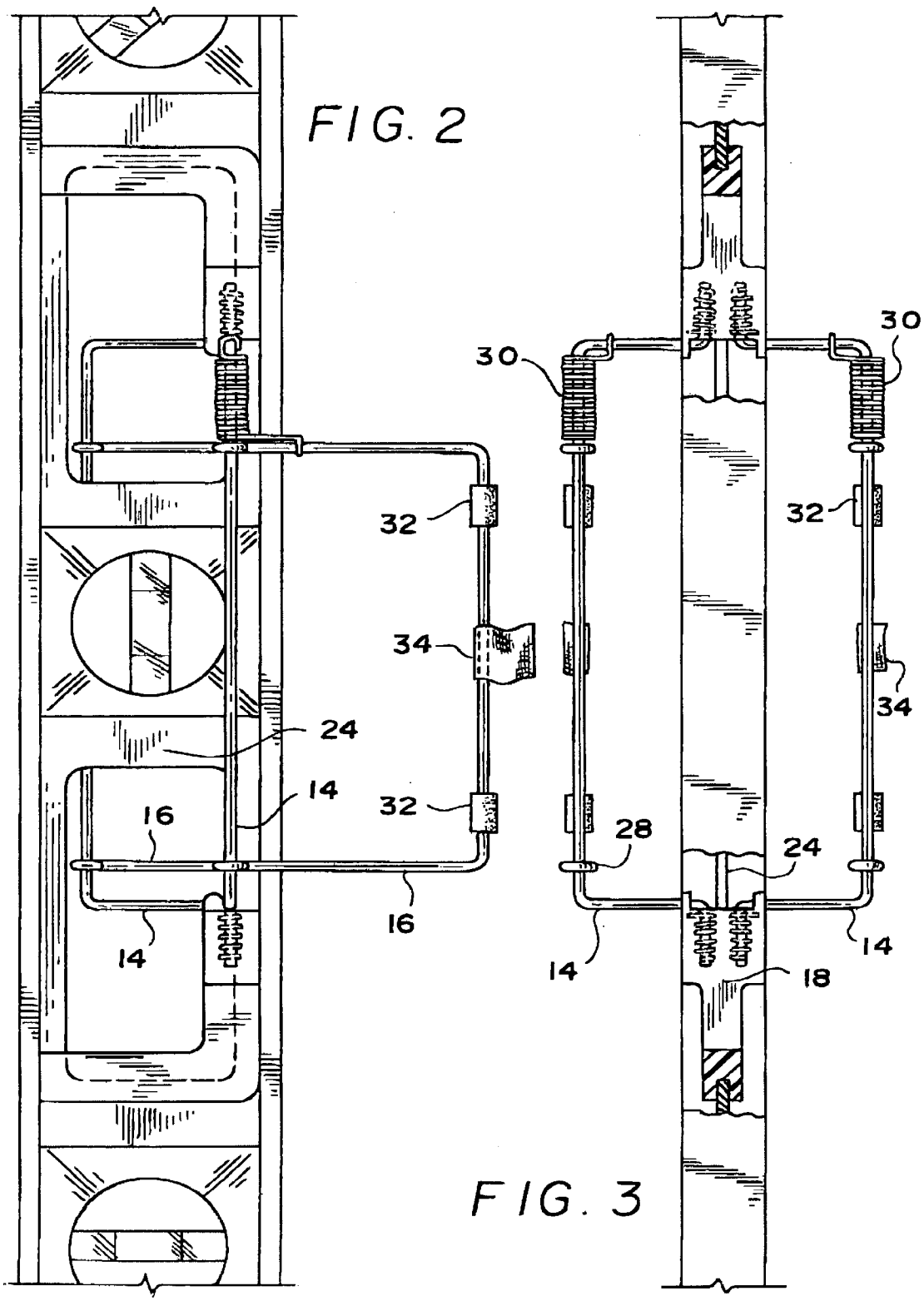
FIG. 2 is a partial side view of the level shown in FIG. 1.
FIG. 3 is a partial top view, with cutaway portions, of the level shown in FIG. 2.

The frame 6 includes an articulated arm, or arm assembly, 12 on each side of the level 2 for releasably securing the level to the test member 4. As best shown in FIGS. 2 through 4, each of the articulated arm assemblies 12 includes a U-shaped inner member 14 and a U-shaped outer member 16, preferably formed from wire rod. The inner member 14 and/or outer member 16 may also be substantially straight or L-shaped. However, the bottom cross-piece extending between each side of the outer U-shaped member 16 allows the arm assembly 12 to be more easily unfolded. Other materials besides wire rod, such as plastic or wood, may also be used and the members 14 and 16 may be produced using other manufacturing processes besides rod bending.

The top, or open, end of each U-shaped inner member is 14 is pivotally connected to a bearing block 18 in the frame 6. The bearing block 18 may be integrally formed in one piece with the frame 6 or securely attached as a separate component. For example, the invention could be provided as kit with an independent arm assembly 12 and/or bearing block 18 which can be easily retrofitted onto a conventional level.

Each bearing block 18 includes two holes, one on each side for receiving a tip portion 20 of a corresponding inner member 14. Each inner member 14 is biased, or urged, to rotate into a folded position against the frame 6 as shown on the left side of FIG. 4. For example, each of the holes in the bearing block 18 may be provided with a torsional spring 22 which will urge the inner member 14 to rotate out of the page in FIG. 3 and press against the webbing 24 of the frame 6. One end of the rotational spring 22 is then secured to, or abuts, the bearing block 18 while the other end of the spring is secured to the inner member 14. The rotational springs 22 may be loaded with about 6 to 10 foot-pounds of initial torque, or 6 to 10 pounds of initial opening force. Numerous other structures may also be used for rotationally biasing the inner members 14 against the frame 6. The inner and outer members 14 and 16 (and/or their pivoting connections) may also be made sufficiently resilient so that the members will clamp against a test member 4 without using springs.

Each outer corner of the bearing blocks 18 includes a detent 26 for locking the inner member 14 in an angular position relative to the frame 6. FIG. 4 shows the right inner member 14 locked in a substantially perpendicular position relative to the frame 6 while left inner member is locked substantially parallel to the frame 6. The detents 26 have a curved outer surface over which the inner member 14 slides as it is pulled out of bearing block 18 against the compression of the spring 22. After crossing the apex of the detent 26, the compression in spring 22 is released and the tip of the inner member snaps back into the bearing block 18 with the inner member 14 in position on the other side of the detent 26. The detents 26 may be arranged at other positions, and/or have other shapes and sizes, in order to provide a variety of other locking motions and positions.

Each of the U-shaped outer members 16 is pivotally secured to an outer portion of an inner member 14. In particular, each of the outer members 16 includes loops 28 at each tip which are wrapped around the bottom cross-piece of the inner member 14. However, other pivoting connections, including hinges, pins, sleeves, or other devices may also be used and the outer members 16 may be attached to the sides of the inner members 14, rather than the bottom. The outer members 16 are rotationally biased with respect to the inner member 16 so that the outer members are also urged to fold against the frame webbing 24. More specifically, a second torsional spring 30 is positioned on the base of the inner U-shaped member 14 with one end abutting, or secured to, the inner member and the other hand abutting, or secured to, the outer member 16. Multiple springs 30 may also be provided on each inner member 16.

In this configuration, the inner and outer members 14 and 16 are urged to rotate in opposite directions. For example, when viewed from the top end of the level 2 shown in FIG. 1, the articulated arm assembly 12 on the viewer's right includes an inner member 14 which is urged to rotate clockwise about the bearing block 18 while the right outer member 16 is urged to rotate counter-clockwise about the inner member 14. Since the top of the U-shaped outer member 16 is attached to the bottom of U-shaped inner member 14, these rotations cause the arm assembly 12 to fold up neatly against the frame 6. In addition, the inner member 14 and the outer member 16 are sized to fit neatly between the flanges of the I-beam frame. However, larger- and/or smaller-sized inner and outer members may also be used.

Optional gripping sleeves 32, or other means for gripping the test surface, such as coatings or knurling, are arranged on the outer cross-piece of outer U-shaped member 16. Lifting tabs 34 are also arranged on the outer member 16 for assisting a user with initially pulling the outer member away from the frame webbing 24. Gripping sleeves and/or tabs may also be provided on the inner member 14. The lifting tabs 34 may also be fitted with magnets and/or holes and the inner and outer members 14 and 16 may be formed with additional curved portions or handles for making the arm assembly 12 easier to pull away from the frame 6.

FIGS. 5 and 6 are perspective views of another embodiment for a level 2. In this embodiment, the frame 6 has been provided with take-up wheels, or spools, 36 for winding bands 38 which have their free ends connected to each side of a hook 40. Alternatively, the hook 40, or other hooking means, may be attached near the middle of a single continuous band extending between each of the spools 36. The spools 36 may have various forms such as wheels, disks, reels, or pins upon which the bands 38 are wrapped. The spools 36 are preferably rotatably attached to the frame webbing 24 which connects the flanges of the I-beam frame 6. However, they may also be fixed to the frame 6 or arranged on the surface of a box frame. Although the spools 36 are shown in FIGS. 5 and 6 with their axes of rotation perpendicular to the frame webbing 24, these rotational axes may also be arranged substantially parallel to the frame webbing 24 and at other angles. The spools 36 may include knobs (not shown) on their outer surface for manually winding each of the bands 38. Alternatively, the spools may include a spring-loaded, motor-driven, ratcheted and/or other winding mechanisms for automatically winding the bands.

The bands 38 may be in the form of elastic bands, cables, filaments, strings, wires, ropes, chains, and/or other structures. The hook 40 is preferably formed from wire rod and has a loop, or other fastener, and permanently attached to the end of the bands 38. However, the hook 40 may also be releaseably attached for easy replacement with a different hook. The hook 40 includes a central curved portion 42 which is shaped to fit on the inside the curved surface of the hole 44 in the sight structure 10 beside the vial 8. In addition, a hook rod 46 may extend across the hole 44 in the sight structure 10 (substantially parallel to the bubble vial 8) for providing another structure upon which to secure the hook 40. As shown in FIG. 6, the bands 38 are unrolled, or unwrapped, from the spools 36 and wrapped around the test member 4 whereupon the hook 40 is secured to the frame 6, preferably inside the hole 44 or on the hook rod 46. The bands 38 may then be tensioned so as to maintain the level 2 in position on the test member 4.

Although FIG. 6 illustrates the spool-side of the frame 6 being mounted against the test member 4, the level 2 may be turned so that the spools 36 and bands 38 do not interfere with any measurements. The spools 36 are preferably in the form of thin reels, disks, or pulleys that fit on the frame webbing 24 between the outside edges of the I-beam so as not to interfere with taking measurements.

Figure 7:
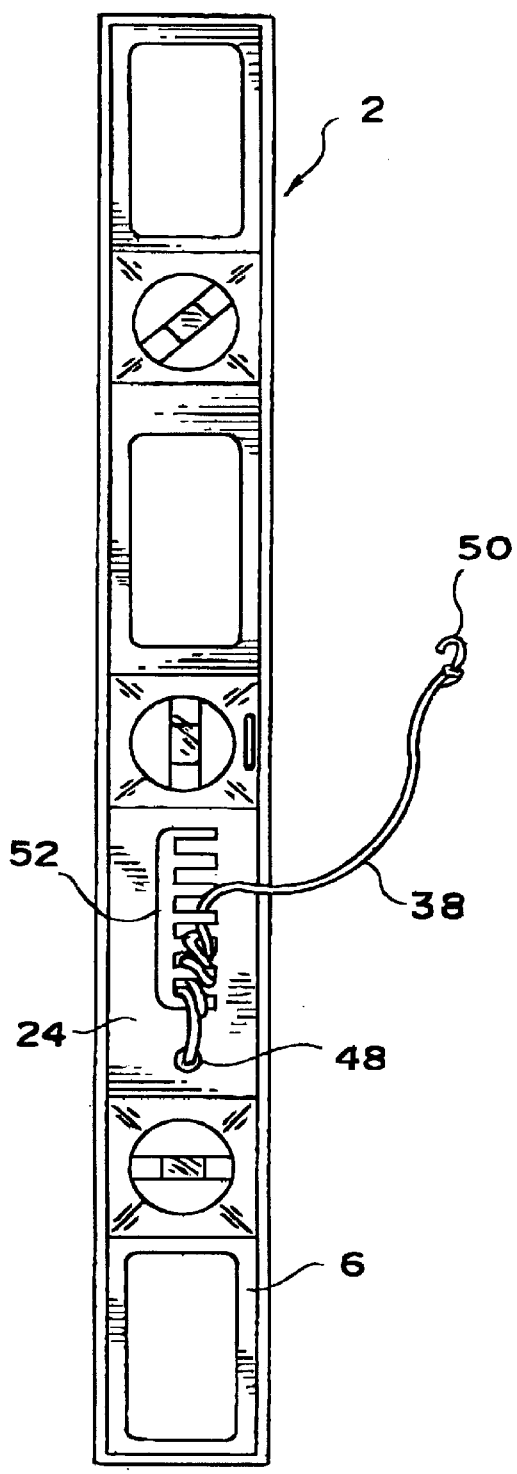
FIG. 7 is a side view of yet another embodiment of a level.

FIG. 7 illustrates yet another embodiment of a level 2 including a band 38 secured to the level to at one end by a swivel 48 which allows the band to pivot against the frame 6. In this configuration, the fixed end of the band 38 is less stressed during use. An alternative hook 50 is releaseably of fixedly secured to the free end of the band 38 for securing the end of the band to the frame once it is wrapped around the test member 4. A comb-like structure 52 attached to the side of the frame 6 includes a plurality of take-up fingers around which any slack in the band 36 can be wrapped. A manual or automatic take-up reel may also be used for storing the band 38. A separate band storage compartment may also be provided.

Figure 8:
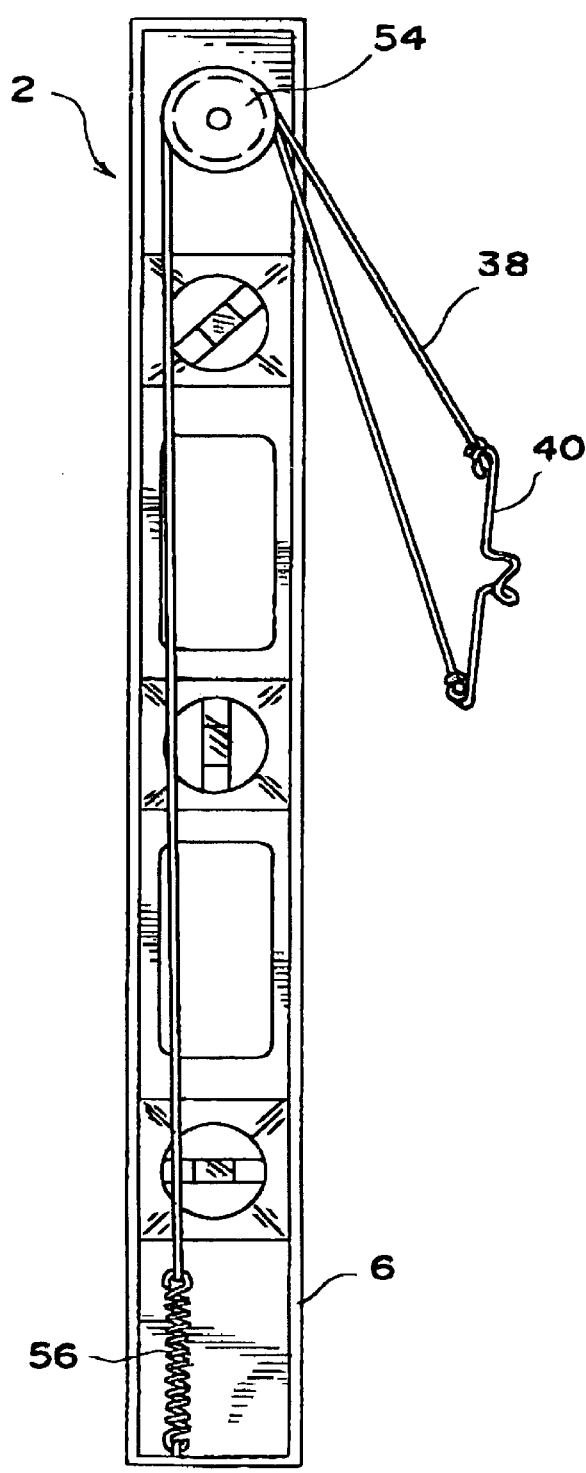
FIG. 8 is a side view of still yet another embodiment of a level.

FIG. 8 illustrates still yet another embodiment of a level 2 including a double-stranded, band 38 which is folded over itself and secured to the frame 6 by a resilient member, or spring, 56. The free ends of the band 38 in FIG. 8 are also connected to each end of a hook 40. The bands 38 are wrapped around an idler wheel 54 which helps position the bands 38 as the resilient member, or tension spring, 56 is stretched and the bands are wrapped around a test member 4.

In a further variation of the embodiment shown in FIG. 8, and as illustrated in FIG. 9, the double stranded band is run through centrally located eyelets, 58 and attached to each end of hook 40. A hook clip 60, the back side of which is shown in FIG. 9, is provided to engage hook 40 and secure level 2 to the test member.

FIG. 10 illustrates a variation of the tab 34 and is shown as 34*a*. In this embodiment, tab or pouch 34(*a*) is much lager than tab 34 and may contain a flat magnetic (not illustrated). 34(*a*) also contains a centrally located opening 62 through which the bubble vial 8 for example, may be viewed. This opening may also be used as a handle also. The tab or pouch may be made of a synthetic or natural fabric or cloth, such as nylon.

Although the invention has been described above with respect to numerous preferred embodiments, it will be readily understood to one of ordinary skill in the art that various additions, substitutions, and/or modifications may be made to these embodiments without departing from the spirit of the invention. It is therefore intended that the scope of protection for the invention be limited only to the subject matter of the following properly interpreted claims.

What is claimed is:

1. A level, comprising:

a frame having a reference surface;

a level sensor secured to the frame;

an articulated arm pivotally connected at one end to the frame for securing the reference surface to a test surface;

said articulated arm includes an inner member pivotally connected to the frame at one end and an outer member extending from a free end of the inner member;

said inner member is rotationally biased against the frame;

said outer member is also pivotally connected to the inner member and rotationally biased against the inner member; and said inner and outer members are rotationally biased in opposite directions.

2. A level as recited in claim 1 further comprising a gripping tab on a free end of the outer member.

3. A level as recited in claim 2 further comprising a gripping sleeve arranged on at least one of the inner and outer members for gripping the test surface.

4. A level as recited in claim 2 wherein the tab contains a central opening positioned for viewing the bubble.

5. A level as recited in claim 4 wherein the tab contains a magnet.

6. A level, comprising:

a frame having a reference surface;

a level sensor secured to the frame;

at least one articulated arm extendable from the frame for clamping the reference surface to a test surface, said articulated arm including an inner member pivotally connected to the frame at one end and a U-shaped outer member pivotally connected at its top end to a free end of the inner member;

means for rotationally biasing the inner member against the frame;

means for rotationally biasing the outer member against the inner member; and said inner and outer members are rotationally biased in opposite directions.

7. A level as recited in claim 6 wherein at least one of the biasing means includes a spring.

8. A level as recited in claim 7 further comprising at least one locking element attachable to the inner member for locking said inner member in an angular position relative to the frame.

9. A level as recited in claim 6 wherein the means for rotationally biasing the inner member against the frame comprises at least one inner member biasing element attachable to the inner member, and the means for rotationally biasing the outer member against the inner member comprises at least one biasing element attachable to the outer member.

* * * * *